(12) United States Patent
Chen (10) Patent No.: US 9,209,906 B2
(45) Date of Patent: Dec. 8, 2015

(54) CLOCK RECOVERY CIRCUIT, OPTICAL RECEIVER, AND PASSIVE OPTICAL NETWORK DEVICE

(71) Applicant: Huawei Technologies Co., Ltd., Shenzhen, Guangdong (CN)

(72) Inventor: Deqiang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 14/284,979

(22) Filed: May 22, 2014

(65) Prior Publication Data

US 2015/0003842 A1    Jan. 1, 2015

(30) Foreign Application Priority Data

Jun. 26, 2013    (CN) .......................... 2013 1 0259486

(51) Int. Cl.
*H04B 10/60* (2013.01)
*H04L 7/033* (2006.01)
*H04L 7/00* (2006.01)

(52) U.S. Cl.
CPC .............. *H04B 10/60* (2013.01); *H04L 7/0337* (2013.01); *H04L 7/0083* (2013.01)

(58) Field of Classification Search
None
See application file for complete search history.

(56) References Cited

U.S. PATENT DOCUMENTS

| 6,728,493 | B1* | 4/2004 | Whittaker | H04B 10/66 398/154 |
| 6,977,975 | B1* | 12/2005 | Reuveni | H04L 7/0338 360/32 |
| 7,016,447 | B1* | 3/2006 | Reuveni | H04L 7/0338 327/144 |
| 7,765,074 | B2* | 7/2010 | Kim | H03L 7/0814 375/355 |
| 2006/0055472 | A1* | 3/2006 | Bietti | H03K 3/0322 331/57 |
| 2007/0047689 | A1* | 3/2007 | Menolfi | H03D 3/006 375/376 |
| 2011/0293047 | A1* | 12/2011 | Yamabana | H04B 10/69 375/340 |
| 2012/0307949 | A1* | 12/2012 | Dvir | H04L 7/005 375/376 |

* cited by examiner

*Primary Examiner* — Ken Vanderpuye
*Assistant Examiner* — Merlin Brito Peguero (57) ABSTRACT

The present invention discloses a clock recovery circuit, an optical receiver, and a passive optical network device. In the clock recovery circuit provided by the embodiment of the present invention, a first signal indicating whether a data loss abnormality occurs in initial serial data is introduced at a side of a phase detector, and a phase adjustment control signal is output to a phase adjustor according to a state of the first signal; and the phase adjustor performs different types of phase adjustment according to a state of the initial serial data, so that a data sampler can recover an accurate clock when the initial serial data is normal and can implement smooth switching of output clock information in special cases such as initial serial data clock loss or recovery, and no great abrupt phase change occurs, thereby ensuring stable and reliable working of a system.

12 Claims, 4 Drawing Sheets

CLOCK RECOVERY CIRCUIT, OPTICAL RECEIVER, AND PASSIVE OPTICAL NETWORK DEVICE

CROSS-REFERENCE TO RELATED APPLICATIONS

This application claims priority to Chinese Patent Application No. 201310259486.6, filed with the Chinese Patent Office on Jun. 26, 2013, which is incorporated herein by reference in its entirety.

TECHNICAL FIELD

The present invention relates to the field of communications technologies, and in particular, to a clock recovery circuit, an optical receiver, and a passive optical network device.

BACKGROUND

Figure 1:
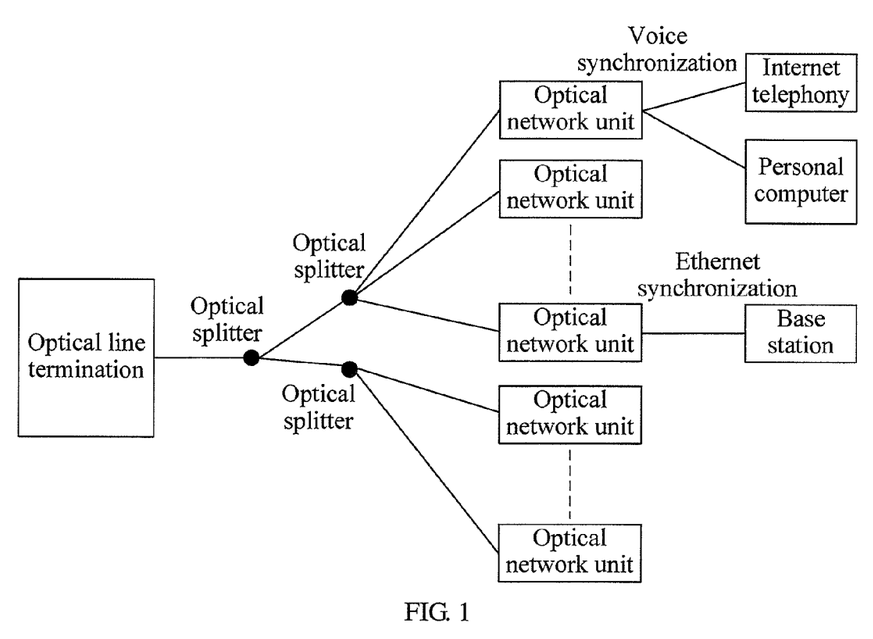
FIG. 1 is an architecture diagram of a PON system.

With the development of communications technologies, PON (Passive Optical Network, passive optical network) systems have already been widely applied in VoIP (Voice over Internet Protocol), WiFi (Wireless Fidelity, wireless fidelity), Ethernet, and other fields of fiber to the home and mobile backhaul. Referring to FIG. 1, a PON system mainly includes a central office device OLT (Optical Line Termination, optical line termination), a remote device ONU (Optical Network Unit, optical network unit), and an ODN (Optical Distribution Network, optical distribution network) located between the OLT and the ONU. The ODN mainly includes such components as an optical fiber and an optical splitter.

In a VoIP application, in order to improve the quality of a voice system, a function of voice synchronization needs to be implemented, that is, clock information of a voice terminal device comes from a network side and is synchronized with a network side clock source, so as to implement clock synchronization between interconnected terminal devices in a voice network. Mobile backhaul also has a strict requirement on clock synchronization, requiring that an Ethernet port of an ONU has a clock synchronization function of Ethernet synchronization, that is, a working clock of the Ethernet port comes from a PON network side and is synchronized with a network side clock source.

Recovery of clock information of the network side is key to implementation of the foregoing feature of clock synchronization. The clock information needs to be extracted and recovered from a data stream delivered by the network side. However, data delivered by the network side may be interrupted or may deteriorate due to various reasons, which may result in loss of data and related clock information. In this case, how to ensure that a recovered clock as a clock source for clock synchronization is output and has a stable quality is a key issue for a system.

SUMMARY

Embodiments of the present invention provide a clock recovery circuit, an optical receiver, and a passive optical network device, to ensure that an optical network unit can output a clock stably in high quality when clock information in data delivered by a network side is lost or when clock information is recovered.

A clock recovery circuit includes: a data sampler, a phase detector, a phase adjustor, a master clock delay phase locker, and a slave clock delay phase locker, where the data sampler is configured to: during $(i+1)^{th}$ sampling, sample the initial serial data according to an $i^{th}$ group of M clocks output by the slave clock delay phase locker, to obtain M pieces of sample serial data used for clock recovery, where M and i are positive integers;

the phase detector is configured to detect the M pieces of sample serial data obtained by sampling by the data sampler, to obtain phase relationship between the M pieces of sample serial data, generate a phase adjustment control signal according to the phase relationship between the M pieces of sample serial data and a state of a first signal, and transmit the phase adjustment control signal to the phase adjustor, where the first signal is used to indicate whether a data loss abnormality occurs in the initial serial data;

the master clock delay phase locker is configured to perform frequency multiplication on a reference clock input to the master clock delay phase locker, provide a delay so as to divide the reference clock into N clocks with equal phase intervals, and transmit the N clocks to the phase adjustor, where N is a positive integer;

the phase adjustor is configured to select a first clock from the N clocks under control of the phase adjustment control signal and transmit the first clock to the slave clock delay phase locker; and the slave clock delay phase locker is configured to receive the first clock and provide a delay, generate an $(i+1)^{th}$ group of M clocks with equal phase intervals, and transmit the $(i+1)^{th}$ group of M clocks to the data sampler, where the $(i+1)^{th}$ group of M clocks is used to control $(i+2)^{th}$ sampling of the data sampler.

In a first possible implementation manner, with reference to the first aspect, when the first signal indicates that the initial serial data is in a data loss state, the phase detector outputs a fixed phase adjustment control signal, so that the phase adjustor performs no phase adjustment; and when the first signal indicates that the initial serial data returns to a normal state from the data loss state, the phase detector adjusts the output phase adjustment control signal according to the detected M pieces of sample serial data, so that the phase adjustor performs phase adjustment according to the phase adjustment control signal.

Specifically, the reference clock is a clock generated by a crystal or a crystal oscillator.

In a second possible implementation manner, with reference to the first aspect or the first possible implementation manner of the first aspect, when the first signal indicates that the initial serial data is in a normal state, the phase detector outputs a first phase adjustment control signal to the phase adjustor, so that the data sampler obtains, under control of the phase adjustor, a clock matching the initial serial data from the initial serial data; or when the first signal indicates that the serial data is in a data loss state, the phase detector outputs a second phase adjustment control signal to the phase adjustor, so that the first clock output by the phase adjustor is locked to the reference clock.

Specifically, a frequency of the reference clock is 19.44 MHz, or 25 MHz, or 77.76 MHz;

M is equal to 4, or 8, or 16; and

N is equal to 4, or 8, or 16, or 32, or 64.

The circuit is applicable to an Ethernet passive optical network EPON, or a gigabit passive optical network GPON, or a 10 G EPON, or a 10 G GPON.

According to a second aspect, an embodiment of the present invention further provides an optical receiver, including a clock recovery circuit, where the clock recovery circuit includes: a data sampler, a phase detector, a phase adjustor, a master clock delay phase locker, and a slave clock delay phase locker, where the data sampler is configured to: during $(i+1)^{th}$ sampling, sample the initial serial data according to an $i^{th}$ group of M clocks output by the slave clock delay phase locker, to obtain M pieces of sample serial data used for clock recovery, where M and i are positive integers;

the phase detector is configured to detect the M pieces of sample serial data obtained by sampling by the data sampler, to obtain phase relationship between the M pieces of sample serial data, generate a phase adjustment control signal according to the phase relationship between the M pieces of sample serial data and a state of a first signal, and transmit the phase adjustment control signal to the phase adjustor, where the first signal is used to indicate whether a data loss abnormality occurs in the initial serial data;

the master clock delay phase locker is configured to perform frequency multiplication on a reference clock input to the master clock delay phase locker, provide a delay so as to divide the reference clock into N clocks with equal phase intervals, and transmit the N clocks to the phase adjustor, where N is a positive integer;

the phase adjustor is configured to select a first clock from the N clocks under control of the phase adjustment control signal and transmit the first clock to the slave clock delay phase locker; and the slave clock delay phase locker is configured to receive the first clock and provide a delay, generate an $(i+1)^{th}$ group of M clocks with equal phase intervals, and transmit the $(i+1)^{th}$ group of M clocks to the data sampler, where the $(i+1)^{th}$ group of M clocks is used to control $(i+2)^{th}$ sampling of the data sampler.

According to a third aspect, an embodiment of the present invention provides a passive optical network device, where the device includes an optical receiver, and the optical receiver includes any one of the foregoing clock recovery circuits.

In the clock recovery circuit provided by the embodiments of the present invention, the first signal indicating whether a data loss abnormality occurs in the initial serial data is introduced at a side of the phase detector, and the phase adjustment control signal is output to the phase adjustor according to a state of the first signal, that is, the phase adjustor is controlled according to a state of serial data transmitted from a network side; and the phase adjustor performs different types of phase adjustment according to a state of the initial serial data, so that the data sampler can recover a clock matching the initial serial data when the initial serial data is normal and output a local reference clock in special cases such as initial serial data clock loss or recovery, thereby ensuring that the clock is output in high quality.

DESCRIPTION OF EMBODIMENTS

Figure 2:
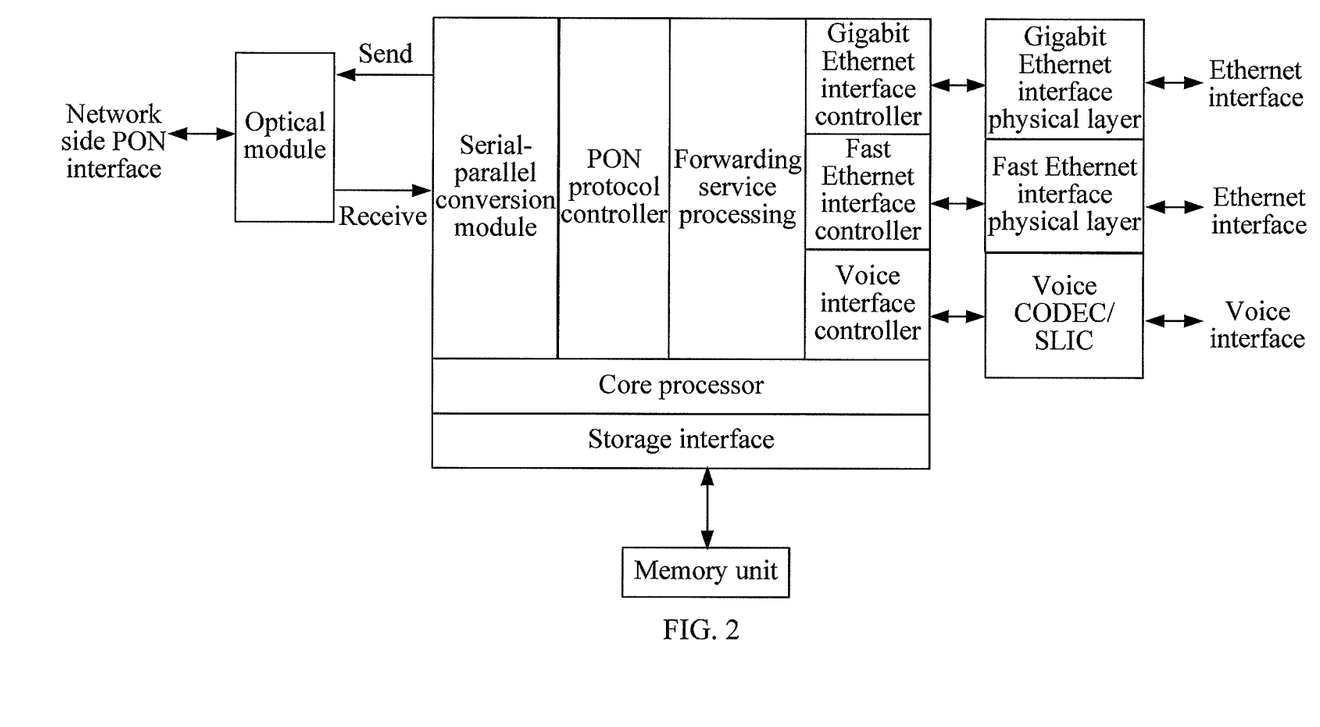
FIG. 2 is an architecture diagram of an ONU.

An architecture diagram of an ONU (Optical Network Unit, optical network unit) is shown in FIG. 2. An Ethernet synchronization feature requires that a working reference clock of a gigabit Ethernet interface controller/fast Ethernet interface controller and a gigabit Ethernet interface physical layer/fast Ethernet interface physical layer in FIG. 2 must synchronize with a clock source recovered by a serial-parallel conversion module from data received by a network side PON (Passive Optical Network, passive optical network) interface; a voice synchronization feature requires that a working reference clock of a voice interface controller and a voice CODEC/SLIC in FIG. 2 must synchronize with the clock source recovered by the serial-parallel conversion module from the data received by the network side PON interface; and a receiving side of an optical module converts an optical signal of the network side PON interface into a serial electrical signal, and the serial-parallel conversion module recovers a clock of a network side from the serial electrical signal received from the optical module.

Figure 3:
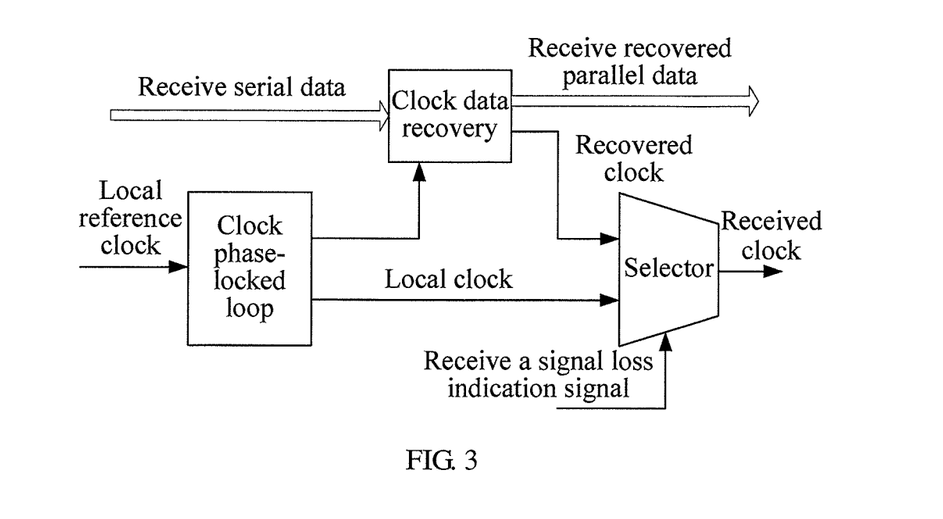
FIG. 3 is a function block diagram of a clock recovery module for implementing clock recovery in an ONU.

The function of the ONU of recovering clock information from data of the network side is usually implemented by the serial-parallel conversion module of the ONU. A function block diagram of a clock recovery module for implementing clock recovery inside the serial-parallel conversion module is shown in FIG. 3.

The receiving side of the optical module converts the received optical signal into the serial electrical signal, and outputs the serial electrical signal to the serial-parallel conversion module. The clock recovery module inside the serial-parallel conversion module recovers the clock and parallel data from the serial data, and outputs the clock along with the corresponding data to a PON protocol controller. An optical fiber in a network side line may be plugged or removed, which may cause lose of signal to occur in an ONU side. In this case, the recovered clock to be received may be lost. One solution is to receive a signal loss indication signal to control a received clock, which is finally output, to automatically switch between the recovered clock and a local clock.

Embodiments of the present invention provide a clock recovery circuit, an optical receiver, and a passive optical network device, to ensure that an optical network unit can output a clock stably in high quality when clock information in data delivered by a network side is lost or when clock information is recovered.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides a clock recovery circuit, including: a data sampler, a phase detector, a phase adjustor, a master clock delay phase locker, and a slave clock delay phase locker.

The data sampler is configured to: during $(i+1)^{th}$ sampling, sample the initial serial data according to an $i^{th}$ group of M clocks output by the slave clock delay phase locker, to obtain M pieces of sample serial data used for clock recovery, where M and i are positive integers.

It should be noted that, when the data sampler performs initial sampling, that is, first sampling, the data sampler samples the initial serial data, which is input to the data sampler, according to an $0^{th}$ group of M clocks output by the slave clock delay phase locker (that is, M clocks generated by the master clock delay phase locker when no phase adjustment control signal exists), to obtain M pieces of sample serial data used for clock recovery. The phase detector detects the M pieces of sample serial data, that is, a plurality of groups of serial data obtained by the data sampler during the first sampling, and performs subsequent processing according to a detection result.

The phase detector is configured to detect the M pieces of sample serial data obtained by sampling by the data sampler, to obtain phase relationship between the M pieces of sample serial data, generate a phase adjustment control signal according to the phase relationship between the M pieces of sample serial data and a state of a first signal, and transmit the phase adjustment control signal to the phase adjustor, where the first signal is used to indicate whether a data loss abnormality occurs in the initial serial data;

the master clock delay phase locker is configured to perform frequency multiplication on a reference clock input to the master clock delay phase locker, provide a delay so as to divide the reference clock into N clocks with equal phase intervals, and transmit the N clocks to the phase adjustor, where N is a positive integer;

the phase adjustor is configured to select a first clock from the N clocks under control of the phase adjustment control signal and transmit the first clock to the slave clock delay phase locker; and the slave clock delay phase locker is configured to receive the first clock and provide a delay, generate an $(i+1)^{th}$ group of M clocks with equal phase intervals, and transmit the $(i+1)^{th}$ group of M clocks to the data sampler, where the $(i+1)^{th}$ group of M clocks is used to control $(i+2)^{th}$ sampling of the data sampler.

The reference clock is a clock generated by a crystal or a crystal oscillator, and the crystal or the crystal oscillator is located in a passive optical network device where the clock recovery circuit is located.

The $0^{th}$ group of M clocks, the $i^{th}$ group of M clocks, and the $(i+1)^{th}$ group of M clocks respectively represent M clocks separately obtained by the slave clock delay phase locker at the first time, at the $(i+1)^{th}$ time, and at the $(i+1)^{th}$ time.

It should be noted that, in the embodiment of the present invention, the initial serial data input to the data sampler is obtained by an optical module of an ONU side by converting a received optical signal; the data sampler can obtain, under control of a plurality of clocks, a plurality of groups of serial data of different phases from the initial serial data, and analyze the plurality of groups of serial data to obtain a clock meeting a requirement.

The embodiment of the present invention introduces the first signal related to serial data loss as a control signal. According to different states of the initial serial data, the phase detector outputs different phase adjustment control signals. The phase adjustor performs different types of adjustment under control of the phase adjustment control signals, so that the slave clock delay phase locker obtains different M clocks, and the M clocks control the sampling of the data sampler.

Specifically, when the first signal indicates that the initial serial data is in a data loss state, the phase detector outputs a fixed phase adjustment control signal, so that the phase adjustor performs no phase adjustment. During this process, a clock output by the data sampler maintains a fixed phase relationship with a clock input by the master clock delay phase locker, and no adjustment is performed according to the serial data. No extra abrupt phase change occurs during this process, and the clock switches to the reference clock smoothly.

When the first signal indicates that the initial serial data returns to a normal state from the data loss state, the phase detector adjusts the output phase adjustment control signal according to the detected M pieces of sample serial data, so that the phase adjustor performs phase adjustment according to the phase adjustment control signal; during this process, a clock output by the data sampler follows the serial data, so as to implement clock recovery.

In the embodiment of the present invention, small-granularity gradual adjustment of the phase adjustment control signal is implemented by using a reasonable control mechanism. Therefore, during the whole process, a phase of a clock output by the data sampler is adjusted finely and in a gradual manner, and no abrupt phase change occurs.

As can be seen from the foregoing, in the clock recovery circuit provided by the embodiment of the present invention, the first signal indicating whether a data loss abnormality occurs in the initial serial data is introduced at a side of the phase detector, and the phase adjustment control signal is output to the phase adjustor according to a state of the first signal, that is, the phase adjustor is controlled according to a state of serial data transmitted from a network side; and the phase adjustor performs different types of phase adjustment according to a state of the initial serial data, so that the data sampler can recover an accurate clock when the initial serial data is normal and can implement smooth switching of output clock information in special cases such as initial serial data clock loss or recovery, and no great abrupt phase change occurs, thereby ensuring stable and reliable working of a system.

Figure 4:
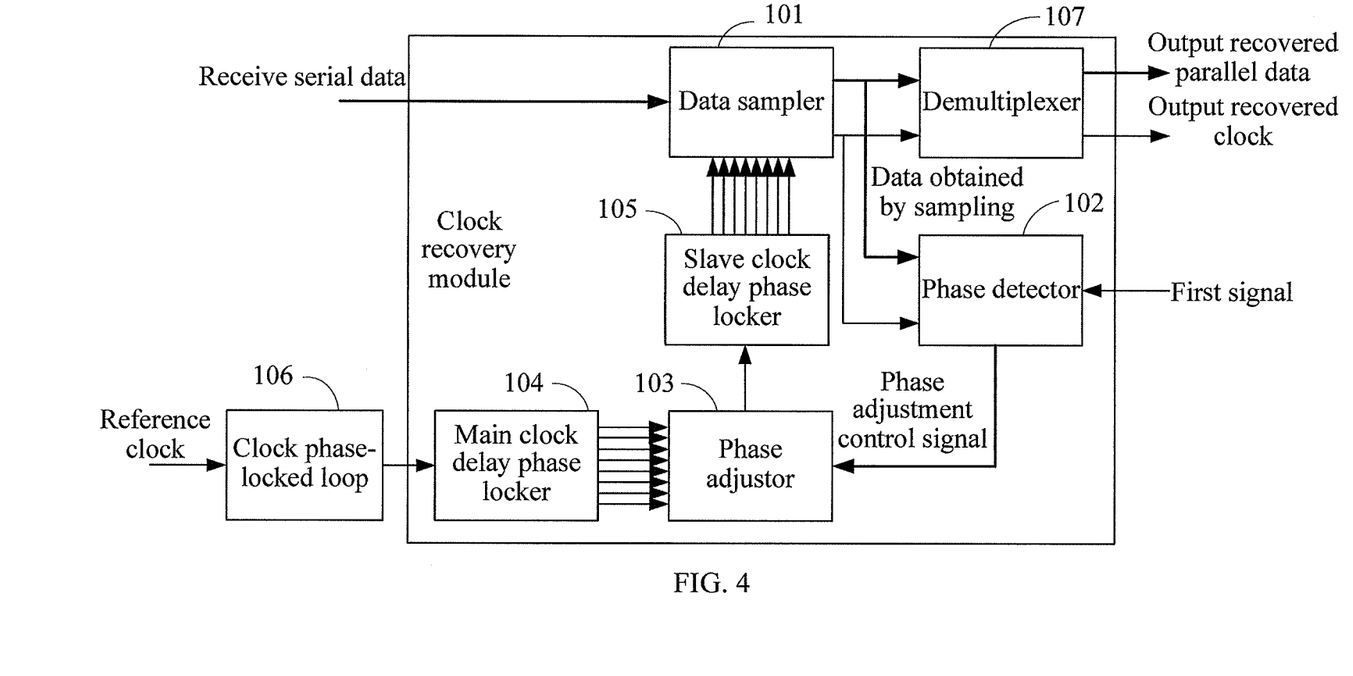
FIG. 4 is a block diagram of a clock recovery circuit provided by an embodiment of the present invention.

An embodiment of the present invention further provides a clock recovery circuit. Referring to FIG. 4, the circuit includes: a data sampler 101, a phase detector 102, a phase adjustor 103, a master clock delay phase locker 104, and a slave clock delay phase locker 105, where the data sampler 101 is configured to: during $(i+1)^{th}$ sampling, sample initial serial data, which is input to the data sampler 101, according to an $i^{th}$ group of M clocks output by the slave clock delay phase locker 105, to obtain M pieces of sample serial data used for clock recovery, where M and i are positive integers.

In the present invention, serial data input to the data sampler 101 is defined as initial serial data, where the initial serial data is obtained by an optical module by converting a received optical signal, and the data sampler 101 is capable of recovering a clock from the sample data.

Further, the data sampler 101 may be connected to a demultiplexer 107. The data sampler 101 transmits the obtained M pieces of sample serial data to the demultiplexer 107. The demultiplexer 107 identifies, according to information about a detection result of the phase detector 102, an effective part of the M pieces of sample serial data output by the data sampler 101, performs distribution and combination to generate parallel data, and provides a clock which undergoes a frequency conversion processing and matches the parallel data.

The phase detector 102 is configured to detect the M pieces of sample serial data obtained by sampling by the data sampler 101, to obtain phase relationship between the M pieces of sample serial data, generate a phase adjustment control signal according to the phase relationship between the M pieces of sample serial data and a state of a first signal, and transmit the phase adjustment control signal to the phase adjustor 103, where the first signal is used to indicate whether a data loss abnormality occurs in the initial serial data.

It should be noted that, in the embodiment of the present invention, a control signal related to line data loss, that is, the first signal, is introduced at a side of the phase detector 102, so that, when network side data (that is, serial data) is normal, the data sampler 101 outputs a clock matching the initial serial data, and when the initial serial data is in a data loss state or returns to a normal state from the data loss state, the data sampler 101 outputs a reference clock in a locked manner, thereby implementing smooth switching between a clock recovered from the serial data and a local reference clock, and keeping an output clock stable.

The master clock delay phase locker 104 is configured to perform frequency multiplication on a reference clock input to the master clock delay phase locker, provide a delay so as to divide the reference clock into N clocks with equal phase intervals, and transmit the N clocks to the phase adjustor, where N is a positive integer.

Further, a clock phase-locked loop 106 may be installed in front of the master clock delay phase locker 104. The clock phase-locked loop 106 multiplies a frequency of the reference clock and transmits, to the master clock delay phase locker 104, the reference clock of which the frequency is multiplied.

The phase adjustor 103 is connected to the phase detector 102 and the master clock delay phase locker 104, and is configured to select from the N clocks under control of the phase adjustment control signal so as to obtain a first clock, and transmit the first clock to the slave clock delay phase locker 105; and the slave clock delay phase locker 105 is configured to receive the first clock from the phase adjustor 103 and provide a delay for the first clock, generate an $(i+1)^{th}$ group of M clocks with equal phase intervals, and transmit the $(i+1)^{th}$ group of M clocks to the data sampler 101, where the $(i+1)^{th}$ group of M clocks is used to control $(i+2)^{th}$ sampling of the data sampler.

Specifically, when the first signal indicates that the initial serial data is in a normal state, the phase detector 102 outputs a first phase adjustment control signal to the phase adjustor 103, so that the data sampler 101 obtains, under control of the phase adjustor 103, a clock matching the initial serial data from the initial serial data.

When the first signal indicates that the initial serial data is in a data loss state, the phase detector 102 outputs a second phase adjustment control signal to the phase adjustor 103, so that the first clock output by the phase adjustor 103 is locked to the reference clock; that is, the serial data obtained by sampling by the data sampler is the reference clock. Further, the reference clock is a clock generated by a crystal or a crystal oscillator of a local device, where the local device refers to a passive optical network device where the clock recovery circuit is located.

A frequency of the reference clock may be 19.44 MHz, or 25 MHz, or 77.76 MHz;

the M may be equal to 4, or 8, or 16; and the N may be equal to 4, or 8, or 16, or 32, or 64.

It should be noted that the clock recovery circuit provided by the embodiment of the present invention may be applicable to an Ethernet passive optical network (Ethernet Passive Optical Network, EPON for short), or a gigabit-capable passive optical network (Gigabit-Capable Passive Optical Network, GPON for short), or a 10 G EPON, or a 10 G GPON.

As can be seen from the foregoing, in the clock recovery circuit provided by the embodiment of the present invention, the first signal indicating whether a data loss abnormality occurs in the initial serial data is introduced at a side of the phase detector, and the phase adjustment control signal is output to the phase adjustor according to a state of the first signal, that is, the phase adjustor is controlled according to a state of serial data transmitted from a network side; and the phase adjustor performs different types of phase adjustment according to a state of the initial serial data. For example, when initial serial data is abnormal, the phase adjustor suspends phase adjustment, locked to a current phase, follows a phase of a local reference clock, and when the serial data recovers, the phase adjustor switches, according to a result of the data sampler, a sample clock source between a plurality of phases clocks which is generated by the master clock delay phase locker and evenly distributed. Each switching is performed only between adjacent phase clocks, so that a sample clock follows a phase of the initial serial data, so as to recover serial data and corresponding clock information. In this way, the data sampler can recover an accurate clock when the initial serial data is normal, and can still maintain high-quality clock output in special cases such as initial serial data clock loss or recovery.

An embodiment of the present invention further provides an optical receiver, including a clock recovery circuit, where the clock recovery circuit includes: a data sampler, a phase detector, a phase adjustor, a master clock delay phase locker, and a slave clock delay phase locker.

The data sampler is configured to: during $(i+1)^{th}$ sampling, sample the initial serial data according to an $i^{th}$ group of M clocks output by the slave clock delay phase locker, to obtain M pieces of sample serial data used for clock recovery, where M and i are positive integers.

When the data sampler performs initial sampling, that first sampling, the data sampler samples the initial serial data, which is input to the data sampler, according to an $0^{th}$ group of M clocks output by the slave clock delay phase locker, that is, initial M clocks (that is, M clocks generated by the master clock delay phase locker when no phase adjustment control signal exists), to obtain M pieces of sample serial data used for clock recovery.

The phase detector is configured to detect the M pieces of sample serial data obtained by sampling by the data sampler, to obtain phase relationship between the M pieces of sample serial data, generate a phase adjustment control signal according to the phase relationship between the M pieces of sample serial data and a state of a first signal, and transmit the phase adjustment control signal to the phase adjustor, where the first signal is used to indicate whether a data loss abnormality occurs in the initial serial data; the master clock delay phase locker is configured to perform frequency multiplication on a reference clock input to the master clock delay phase locker, provide a delay so as to divide the reference clock into N clocks with equal phase intervals, and transmit the N clocks to the phase adjustor, where N is a positive integer;

the phase adjustor is configured to select a first clock from the N clocks under control of the phase adjustment control signal and transmit the first clock to the slave clock delay phase locker; and the slave clock delay phase locker is configured to receive the first clock and provide a delay, generate an $(i+1)^{th}$ group of M clocks with equal phase intervals, and transmit the $(i+1)^{th}$ group of M clocks to the data sampler, where the $(i+1)^{th}$ group of M clocks is used to control $(i+2)^{th}$ sampling of the data sampler.

Further, when the first signal indicates that the initial serial data is in a data loss state, the phase detector outputs a fixed phase adjustment control signal, so that the phase adjustor performs no phase adjustment; and when the first signal indicates that the initial serial data returns to a normal state from the data loss state, the phase detector adjusts the output phase adjustment control signal according to the detected M pieces of sample serial data, so that the phase adjustor performs phase adjustment according to the phase adjustment control signal.

The reference clock is a clock generated by a crystal or a crystal oscillator.

Further, when the first signal indicates that the initial serial data is in a normal state, the phase detector outputs a first phase adjustment control signal to the phase adjustor, so that the data sampler obtains, under control of the phase adjustor, a clock matching the initial serial data from the initial serial data; or when the first signal indicates that the serial data is in a data loss state, the phase detector outputs a second phase adjustment control signal to the phase adjustor, so that the first clock output by the phase adjustor is locked to the reference clock.

A frequency of the reference clock may be 19.44 MHz, or 25 MHz, or 77.76 MHz;

the M may be equal to 4, or 8, or 16; and the N may be equal to 4, or 8, or 16, or 32, or 64.

As can be seen from the foregoing, in the optical receiver provided by the embodiment of the present invention, the first signal indicating whether a data loss abnormality occurs in the initial serial data is introduced at a side of the phase detector, and the phase adjustment control signal is output to the phase adjustor according to a state of the first signal, that is, the phase adjustor is controlled according to a state of serial data transmitted from a network side; and the phase adjustor performs different types of phase adjustment according to a state of the initial serial data, so that the data sampler can recover an accurate clock when the initial serial data is normal and can implement smooth switching of output clock information in special cases such as initial serial data clock loss or recovery, and no great abrupt phase change occurs, thereby ensuring stable and reliable working of a system.

Further, an embodiment of the present invention further provides a passive optical network device. The passive optical network device includes an optical receiver, where the optical receiver is capable of receiving an optical signal from a network side and converts the optical signal into serial data, and the optical receiver includes the clock recovery circuit provided by any one of the foregoing embodiments.

In addition, in the foregoing embodiments, each embodiment has a different focus when described. For a part not described in detail in a certain embodiment, reference may be made to related description in other embodiments.

The clock recovery circuit, the optical receiver, and the passive optical network device provided by the embodiments of the present invention are described in detail above. The principle and implementation manners of the present invention are described herein by using specific examples. The description about the embodiments of the present invention is merely provided for ease of understanding of the method and the core idea of the present invention. In addition, a person of ordinary skill in the art can make variations and modifications to the present invention in terms of specific implementation and application scope according to the idea of the present invention. Therefore, the content of this specification shall not be construed as a limit to the present invention.

What is claimed is:

1. A clock recovery circuit, comprising: a data sampler, a phase detector, a phase adjustor, a master clock delay phase locker, and a slave clock delay phase locker, wherein the data sampler is configured to: during $(i+1)^{th}$ sampling, sample a initial serial data according to an $i^{th}$ group of M clocks output by the slave clock delay phase locker, to obtain M pieces of sample serial data used for clock recovery, wherein M and i are positive integers;

the phase detector is configured to detect the M sample serial data obtained by sampling by the data sampler, to obtain phases relationship of the M pieces of sample serial data, generate a phase adjustment control signal according to the phase relationship between the M pieces of sample serial data and a state of a first signal, and transmit the phase adjustment control signal to the phase adjustor, wherein the first signal is used to indicate whether a data loss abnormality occurs in the initial serial data;

the master clock delay phase locker is configured to perform frequency multiplication on a reference clock input to the master clock delay phase locker, provide a delay so as to divide the reference clock into N clocks with equal phase intervals, and transmit the N clocks to the phase adjustor, wherein N is a positive integer;

the phase adjustor is configured to select a first clock from the N clocks under control of the phase adjustment control signal, and transmit the first clock to the slave clock delay phase locker; and the slave clock delay phase locker is configured to receive the first clock and provide a delay, generate an $(i+1)^{th}$ group of M clocks with equal phase intervals, and transmit the $(i+1)^{th}$ group of M clocks to the data sampler, wherein the $(i+1)^{th}$ group of M clocks is used to control $(i+2)^{th}$ sampling of the data sampler.

2. The circuit according to claim 1, wherein, when the first signal indicates that the initial serial data is in a data loss state, the phase detector outputs a fixed phase adjustment control signal, so that the phase adjustor performs no phase adjustment; and when the first signal indicates that the initial serial data returns to a normal state from the data loss state, the phase detector adjusts the output phase adjustment control signal according to the detected M pieces of sample serial data, so that the phase adjustor performs phase adjustment according to the phase adjustment control signal.

3. The circuit according to claim 1, wherein the reference clock is a clock generated by a crystal or a crystal oscillator.

4. The circuit according to claim 1, wherein, when the first signal indicates that the initial serial data is in a normal state, the phase detector outputs a first phase adjustment control signal to the phase adjustor, so that the data sampler obtains, under control of the phase adjustor, a clock matching the initial serial data from the initial serial data; and when the first signal indicates that the initial serial data is in a data loss state, the phase detector outputs a second phase adjustment control signal to the phase adjustor, so that the first clock output by the phase adjustor is locked to the reference clock.

5. The circuit according to claim 1, wherein a frequency of the reference clock is 19.44 MHz, or 25 MHz, or 77.76 MHz;

M is equal to 4, or 8, or 16; and

N is equal to 4, or 8, or 16, or 32, or 64.

6. The circuit according to claim 1, wherein the circuit is applicable to in an Ethernet passive optical network EPON, or a gigabit passive optical network GPON, or a 10 G EPON, or a 10 G GPON.

7. An optical receiver, comprising a clock recovery circuit, wherein the clock recovery circuit comprises: a data sampler, a phase detector, a phase adjustor, a master clock delay phase locker, and a slave clock delay phase locker, wherein the data sampler is configured to: during $(i+1)^{th}$ sampling, sample the initial serial data according to an $i^{th}$ group of M clocks output by the slave clock delay phase locker, to obtain M pieces of sample serial data used for clock recovery, wherein M and i are positive integers;

the phase detector is configured to detect the M pieces of sample serial data obtained by sampling by the data sampler, to obtain phase relationship between the M pieces of sample serial data, generate a phase adjustment control signal according to the phase relationship between the M pieces of sample serial data and a state of a first signal, and transmit the phase adjustment control signal to the phase adjustor, wherein the first signal is used to indicate whether a data loss abnormality occurs in the initial serial data;

the master clock delay phase locker is configured to perform frequency multiplication on a reference clock input to the master clock delay phase locker, provide a delay so as to divide the reference clock into N clocks with equal phase intervals, and transmit the N clocks to the phase adjustor, wherein N is a positive integer;

the phase adjustor is configured to select a first clock from the N clocks under control of the phase adjustment control signal and transmit the first clock to the slave clock delay phase locker; and the slave clock delay phase locker is configured to receive the first clock and provide a delay, generate an $(i+1)^{th}$ group of M clocks with equal phase intervals, and transmit the $(i+1)^{th}$ group of M clocks to the data sampler, wherein the $(i+1)^{th}$ group of M clocks is used to control $(i+2)^{th}$ sampling of the data sampler.

8. The optical receiver according to claim 7, wherein when the first signal indicates that the initial serial data is in a data loss state, the phase detector outputs a fixed phase adjustment control signal, so that the phase adjustor performs no phase adjustment; and when the first signal indicates that the initial serial data returns to a normal state from the data loss state, the phase detector adjusts the output phase adjustment control signal according to the detected M pieces of sample serial data, so that the phase adjustor performs phase adjustment according to the phase adjustment control signal.

9. The optical receiver according to claim 7, wherein the reference clock is a clock generated by a crystal or a crystal oscillator.

10. The optical receiver according to claim 7, wherein when the first signal indicates that the initial serial data is in a normal state, the phase detector outputs a first phase adjustment control signal to the phase adjustor, so that the data sampler obtains, under control of the phase adjustor, a clock matching the initial serial data from the initial serial data; or when the first signal indicates that the serial data is in a data loss state, the phase detector outputs a second phase adjustment control signal to the phase adjustor, so that the first clock output by the phase adjustor is locked to the reference clock.

11. The optical receiver according to claim 7, wherein a frequency of the reference clock is 19.44 MHz, or 25 MHz, or 77.76 MHz;

M is equal to 4, or 8, or 16; and

N is equal to 4, or 8, or 16, or 32, or 64.

12. A passive optical network device, comprising an optical receiver, wherein the optical receiver comprises the clock recovery circuit according to claim 1.

* * * * *